United States Patent
Lee et al.

(10) Patent No.: US 10,761,367 B2
(45) Date of Patent: Sep. 1, 2020

(54) BACKLIGHT UNIT AND DISPLAY APPARATUS INCLUDING THE SAME

(71) Applicant: LG ELECTRONICS INC., Seoul (KR)

(72) Inventors: Uihyung Lee, Seoul (KR); Sojung Kim, Seoul (KR); Eunseok Kim, Seoul (KR); Jeonggyu Kim, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/984,991

(22) Filed: May 21, 2018

(65) Prior Publication Data
US 2018/0341150 A1 Nov. 29, 2018

(30) Foreign Application Priority Data
May 23, 2017 (KR) ........................ 10-2017-0063668

(51) Int. Cl.
*G02F 1/1333* (2006.01)
*G02F 1/1335* (2006.01)
*G02F 1/13357* (2006.01)

(52) U.S. Cl.
CPC .. *G02F 1/133602* (2013.01); *G02F 1/133308* (2013.01); *G02F 1/133504* (2013.01);
(Continued)

(58) Field of Classification Search
CPC ......... G02F 1/133308; G02F 1/133602; G02F 1/133553; G02F 1/133504; G02F 1/133526; G02F 1/133603
See application file for complete search history.

(56) References Cited

U.S. PATENT DOCUMENTS

| | | | |
|---|---|---|---|
| 2008/0074574 A1* | 3/2008 | Huang | G02F 1/133603 349/57 |
| 2013/0070170 A1* | 3/2013 | Namekata | G02F 1/133603 348/836 |

(Continued)

FOREIGN PATENT DOCUMENTS

| KR | 101282029 | 7/2013 |
|---|---|---|
| KR | 1020160022455 | 3/2016 |

OTHER PUBLICATIONS

PCT International Application No. PCT/KR2018/005814, International Search Report dated Sep. 28, 2018, 4 pages.

*Primary Examiner* — Michael H Caley
*Assistant Examiner* — Mariam Qureshi
(74) *Attorney, Agent, or Firm* — Lee, Hong, Degerman, Kang & Waimey PC

(57) ABSTRACT

A backlight unit and a display apparatus including the same are disclosed. The backlight unit includes a support member being concave rearward so as to define an interior space, the support member including a central portion defining a central area of a rear surface of the interior space and a side portion extending outward from a peripheral edge of the central portion while being inclined forward, a plurality of light sources disposed on the central portion so as to radiate light, a plurality of lenses respectively disposed on the plurality of light sources so as to disperse light from the light sources, a reflective sheet covering front surfaces of the central portion and the side portion, and a plurality of scattering members disposed on corner portions of the reflective sheet and protruding from the reflective sheet. The display apparatus includes the backlight unit and a display panel disposed in front of the backlight unit.

12 Claims, 14 Drawing Sheets

(52) U.S. Cl.
CPC .. *G02F 1/133526* (2013.01); *G02F 1/133553* (2013.01); *G02F 1/133603* (2013.01); *G02F 1/133605* (2013.01); *G02F 1/133606* (2013.01); *G02F 2001/133607* (2013.01)

(56) References Cited

U.S. PATENT DOCUMENTS

| | | | |
|---|---|---|---|
| 2014/0211121 A1* | 7/2014 | Cho | G02F 1/133603 349/58 |
| 2016/0131329 A1* | 5/2016 | Park | G02F 1/133603 362/97.1 |
| 2016/0139463 A1* | 5/2016 | Oh | G02F 1/133603 362/97.1 |
| 2016/0146430 A1* | 5/2016 | Yeh | G02F 1/133603 362/308 |
| 2017/0052410 A1 | 2/2017 | Oh et al. | |

* cited by examiner

[FIG. 1]
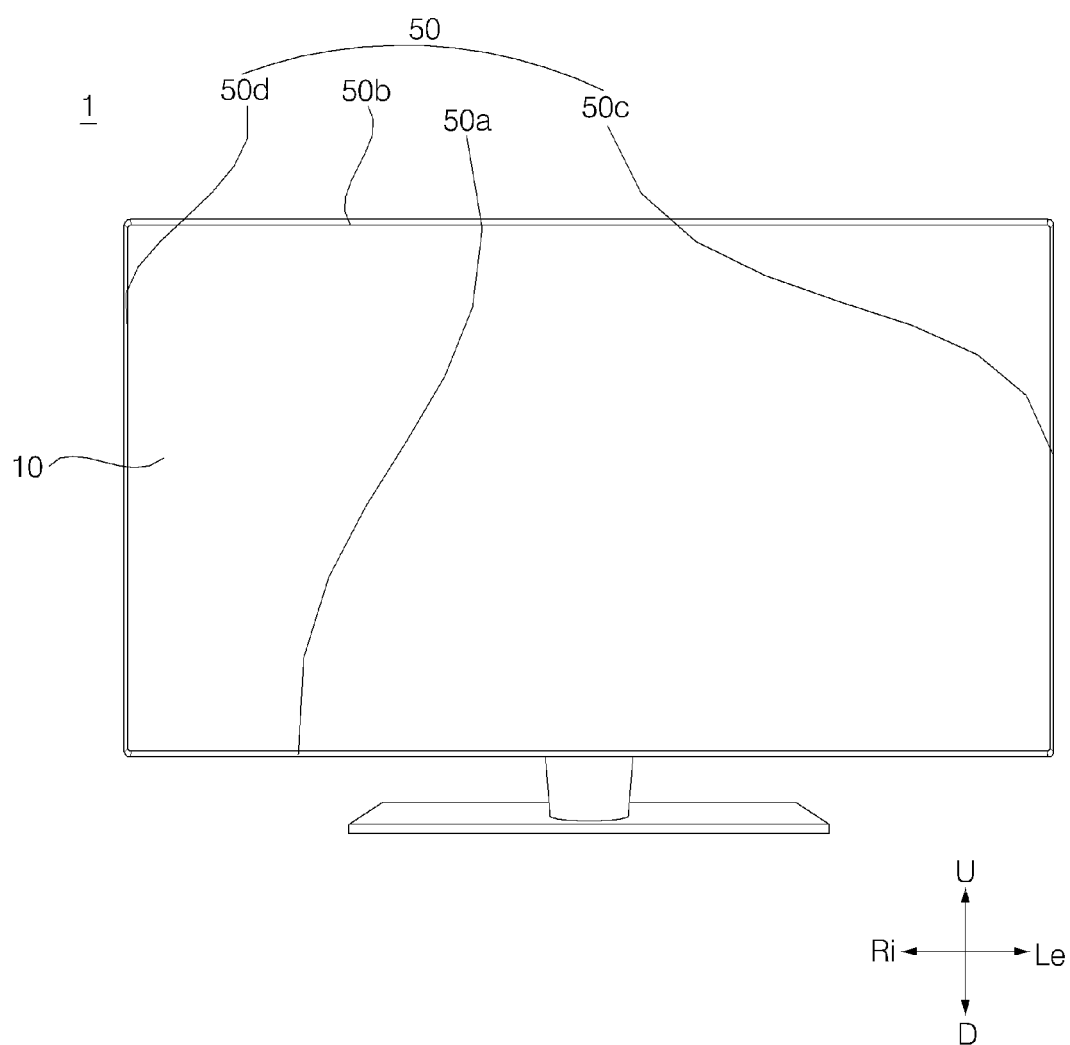

[FIG. 2]
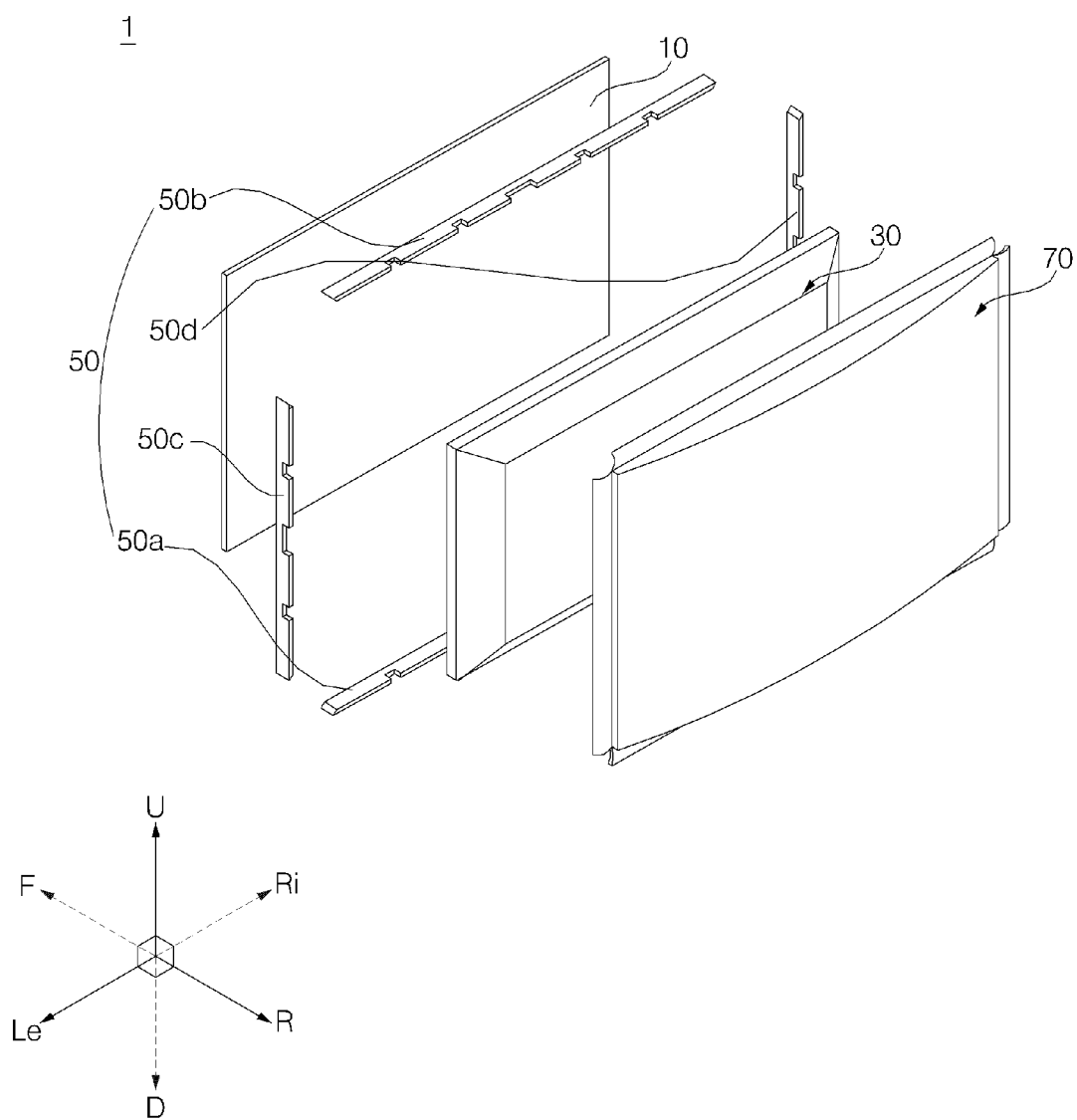

[FIG. 3]
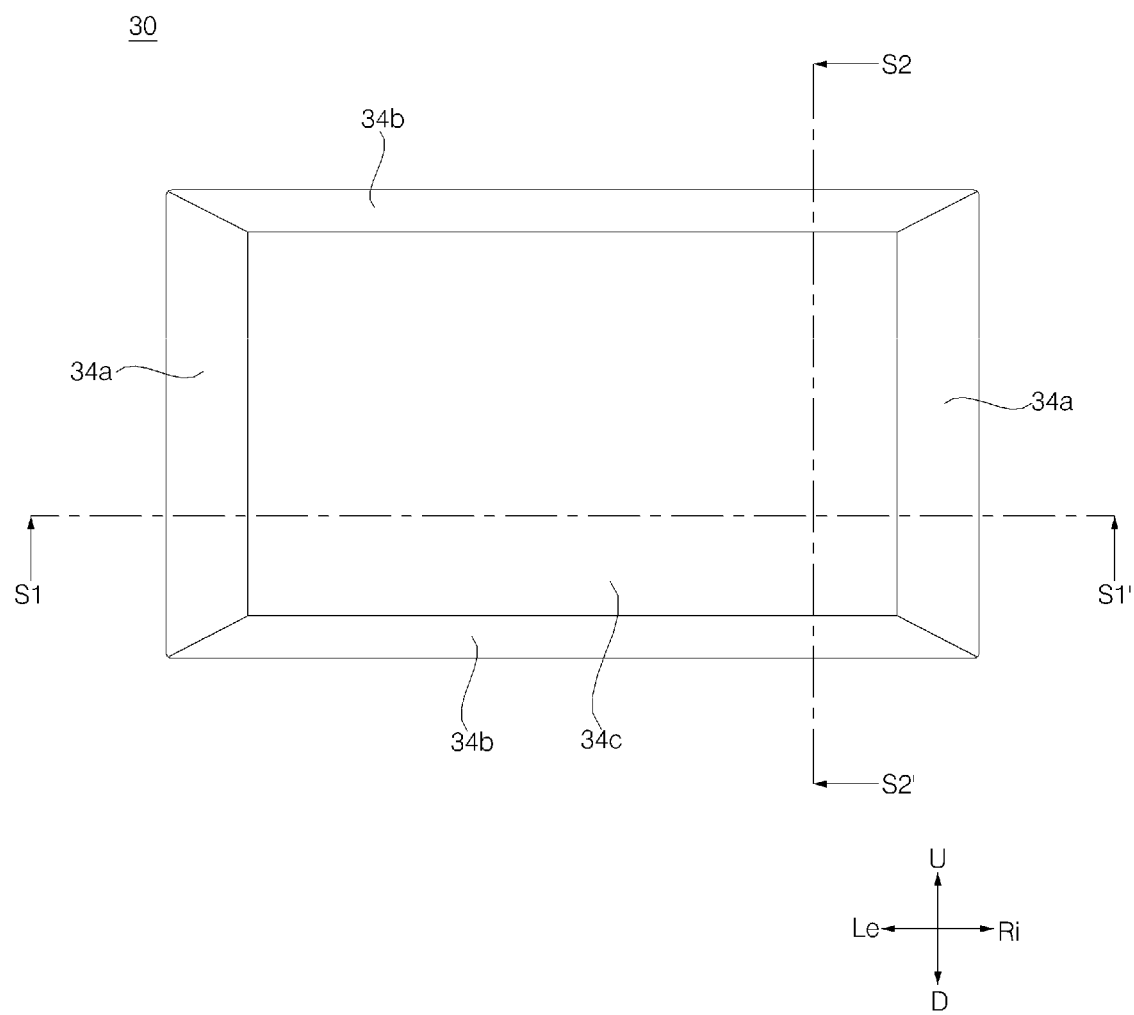

[FIG. 4]
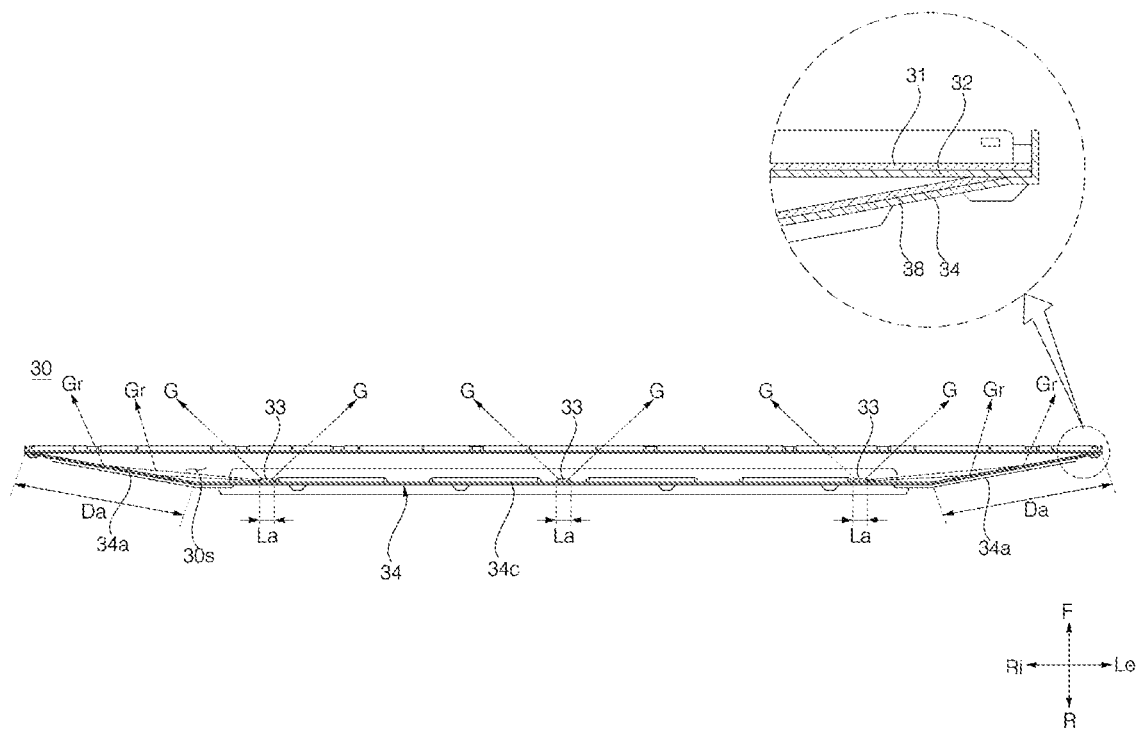

[FIG. 5]
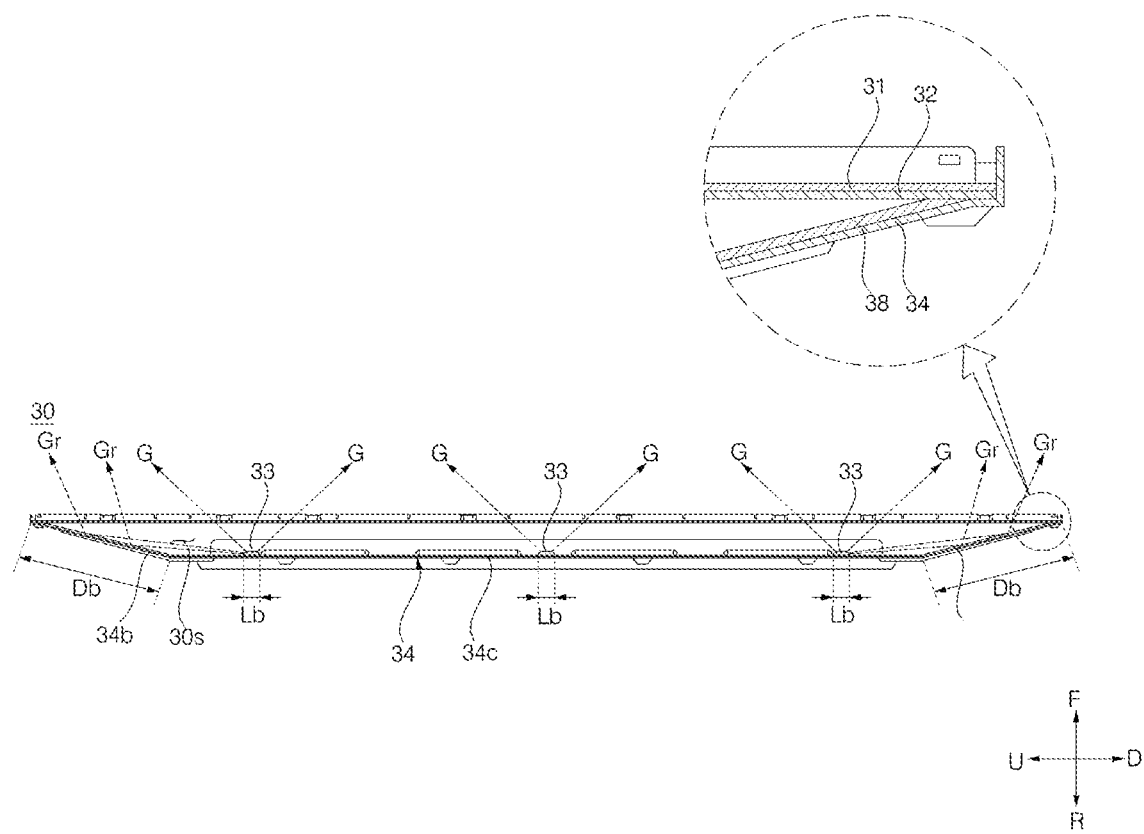

[FIG. 6]
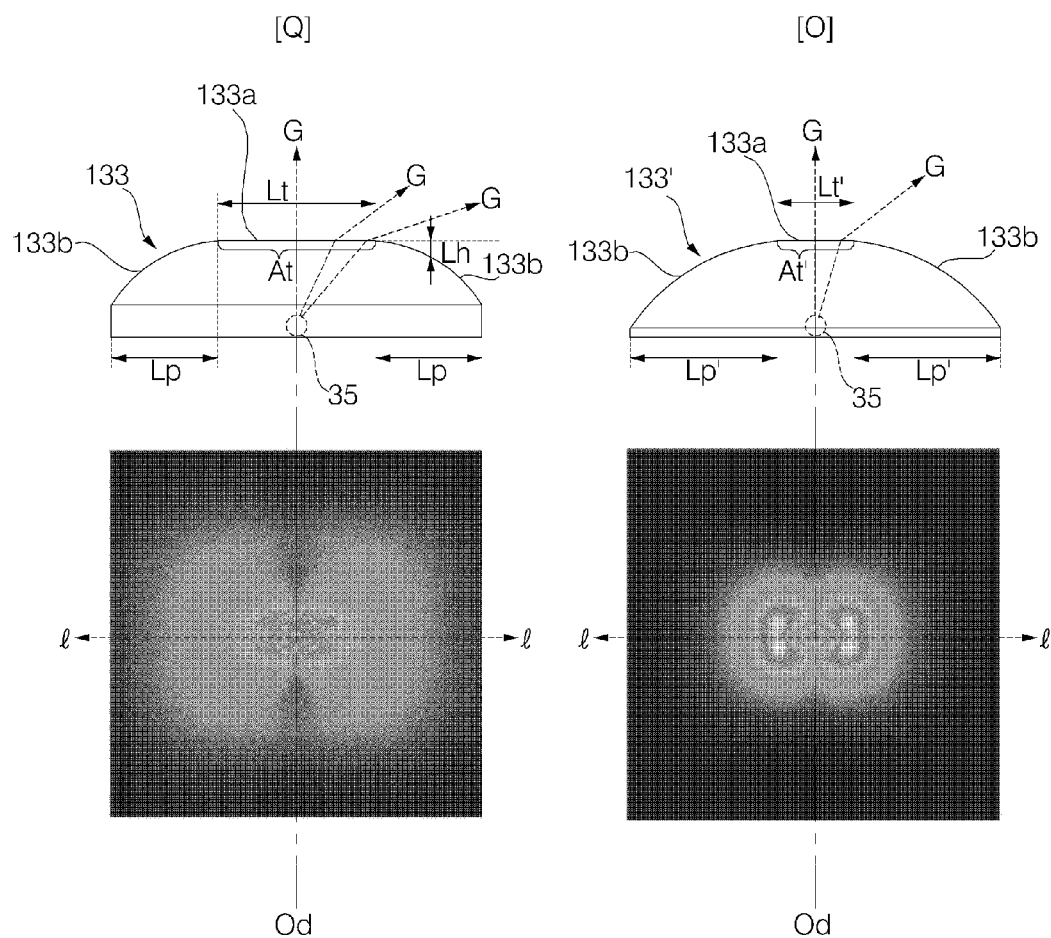

[FIG. 7]
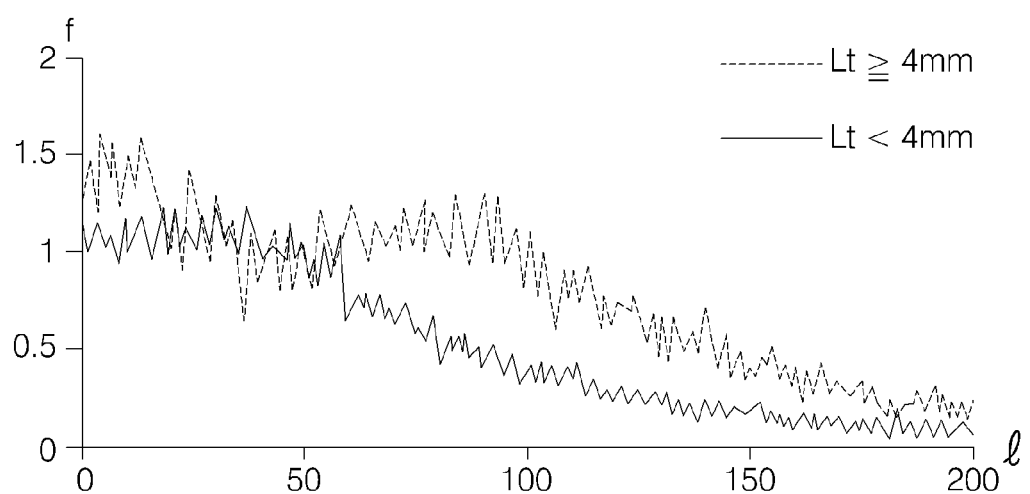

[FIG. 8]
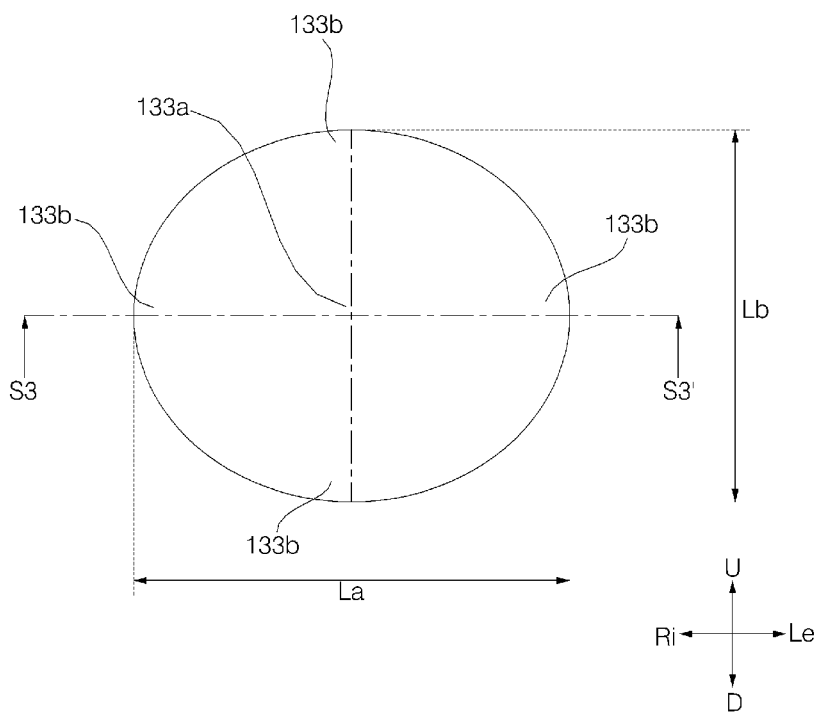
[FIG. 9]
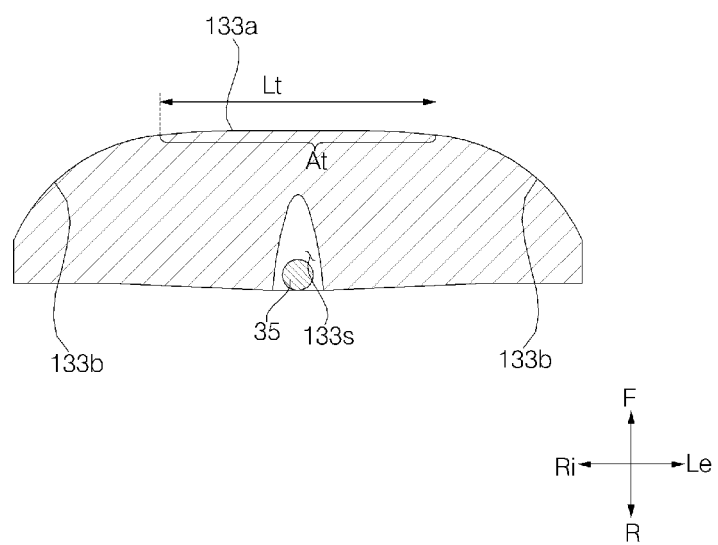

[FIG. 10]
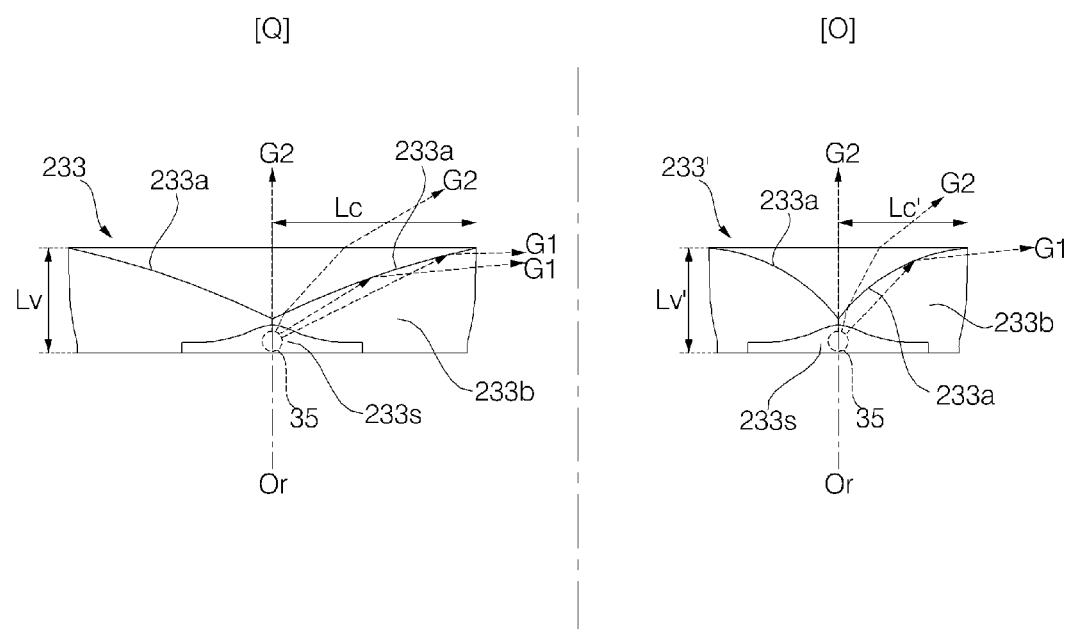

[FIG. 11A]
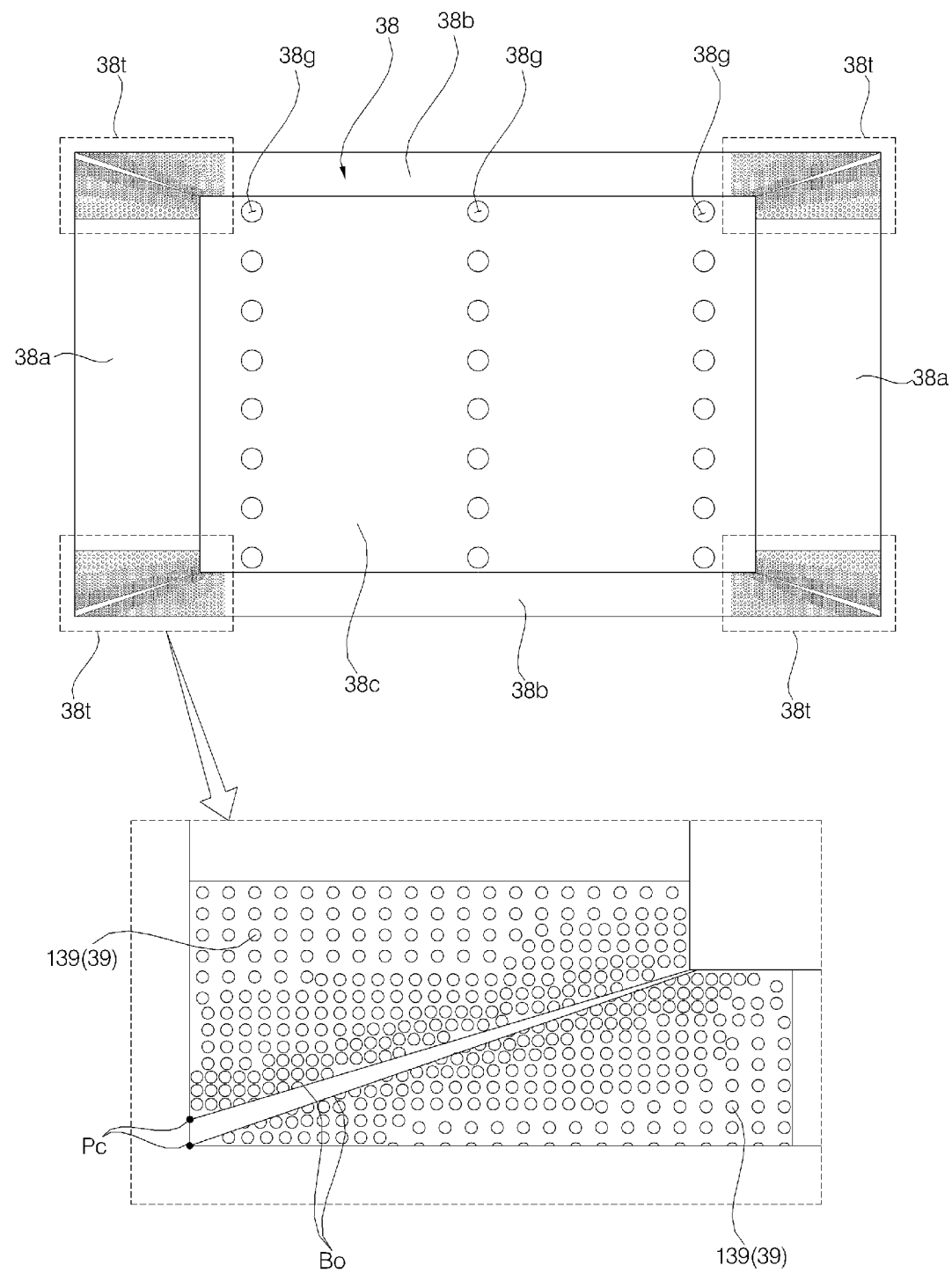

【FIG. 11B】
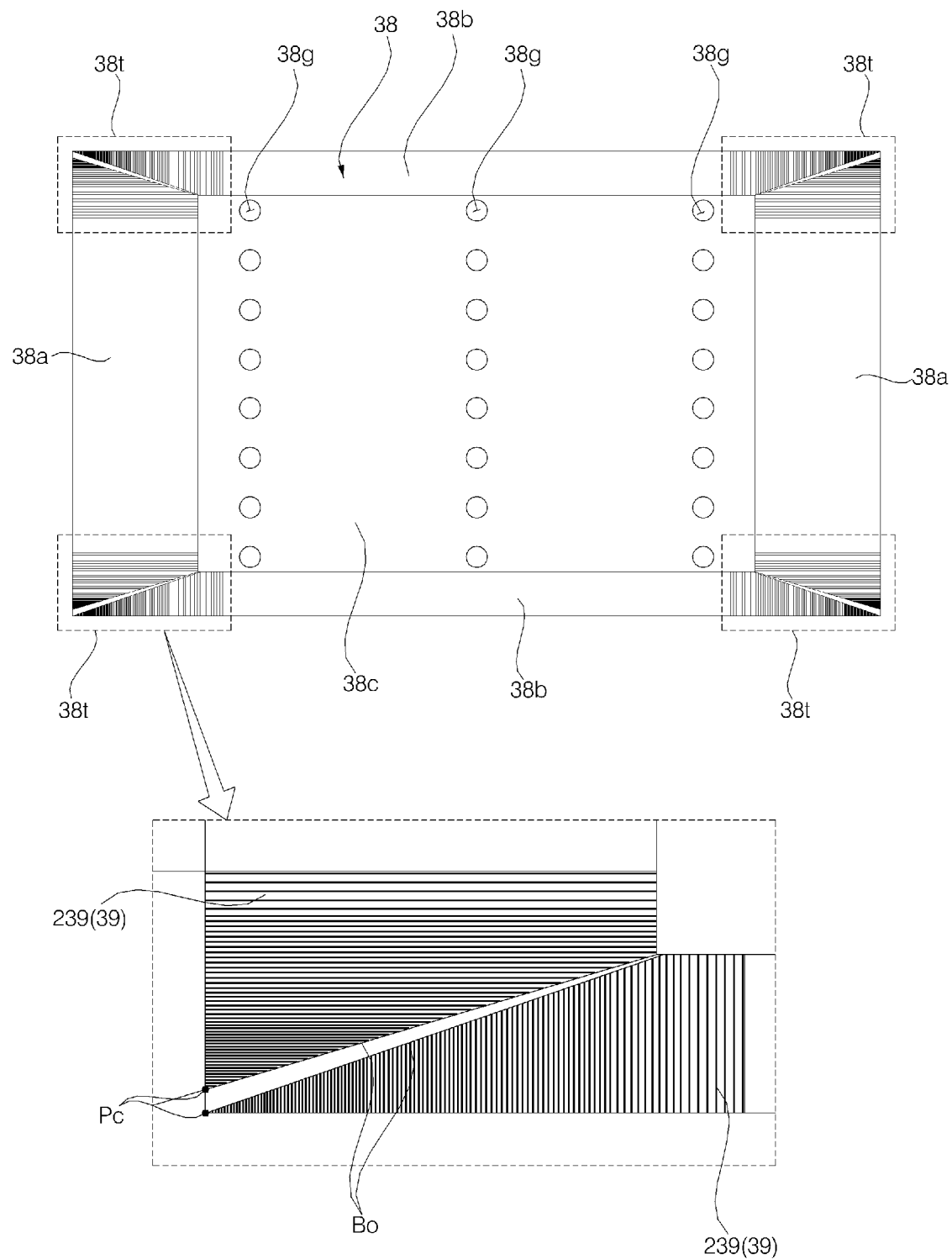

【FIG. 12A】
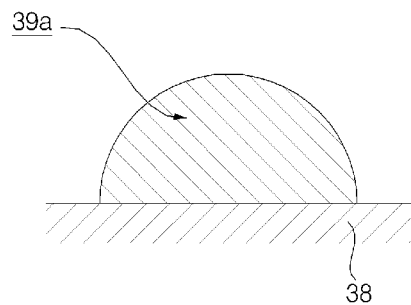
【FIG. 12B】
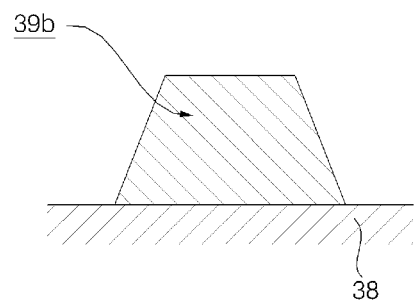
【FIG. 12C】
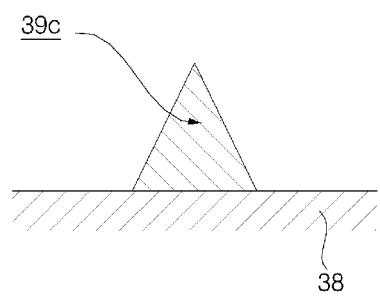

【FIG. 12D】
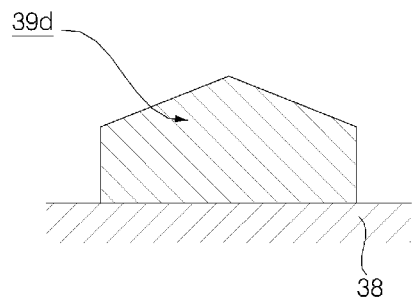
【FIG. 12E】
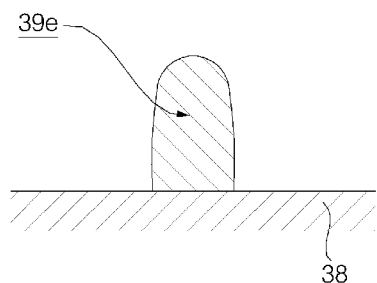
【FIG. 12F】
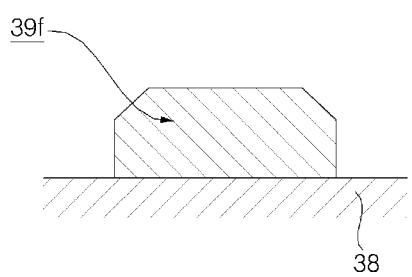

[FIG. 12G]
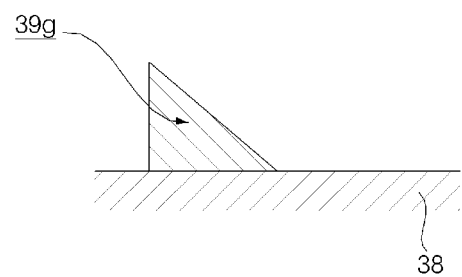

BACKLIGHT UNIT AND DISPLAY APPARATUS INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2017-0063668, filed on May 23, 2017, the contents of which are hereby incorporated by reference herein in its entirety.

BACKGROUND OF THE INVENTION

1. Field of the Invention

The present invention relates to a backlight unit for radiating light to a display panel and a display apparatus including the same.

2. Description of the Related Art

There are various types of display panels that display images. Examples of the display panels include a liquid crystal display panel, a plasma display panel, and an organic light-emitting diode display panel. A thin film transistor liquid-crystal display (TFT-LCD) display apparatus is an example of a display apparatus including a liquid crystal display panel.

A display apparatus, which includes a liquid crystal display panel and so on, includes a backlight unit for radiating light to a display panel from the rear of the display panel. Known is a backlight unit, which adopts a cold cathode fluorescent lamp (CCFL) or a light-emitting diode (LED) as a light source. The backlight unit includes a lens adapted for refraction and/or reflection of light from the light source. The backlight unit further includes a reflective sheet for forwardly reflecting light that is directed in the rearward direction of the backlight unit.

SUMMARY OF THE INVENTION

Therefore, the present invention has been made in view of the above problems, and it is a first object of the present invention to efficiently disperse light of a backlight unit over the entire front surface thereof.

It is a second object of the present invention to uniformly diffuse light of a backlight unit over the entire front surface thereof.

In a conventional backlight unit, there is a problem whereby a relatively dark area is formed at the portion on the front surface of the backlight unit that is located at a relatively long distance from a light source and a lens. It is a third object of the present invention to solve the problem.

Among conventional technologies, there is a technology of providing the rear surface of a backlight unit with a side portion, which is inclined forward, so as to make the peripheral portion of the backlight unit thin. However, since it is difficult to dispose lenses and light sources in the side portion, there is a problem whereby the length of the side portion has to be restricted (which refers to an inclined direction length, which will be described later) in order to suppress the formation of a relatively dark area on the front surface of the backlight unit. Hence, there is a problem whereby restrictions on the design of a display apparatus become severe. It is a fourth object of the present invention to solve this problem.

In order to solve the above problems, a display apparatus according to the present invention includes a display panel, and a backlight unit positioned at a rear side of the display panel, wherein the backlight unit comprises a support member comprising a central portion and one or more side portions extending from edges of the central portion at a forwardly inclined angle; a plurality of light sources disposed at the central portion and configured to emit light; a plurality of lenses correspondingly disposed on the plurality of light sources and configured to disperse the light emitted from the plurality of light sources; and a reflective sheet positioned at a front side of the support member, the reflective sheet comprising a plurality of scattering members protruding from the reflective sheet and configured to scatter the light dispersed by the plurality of lenses.

A top of each of the plurality of lenses may comprise a flat surface, and a width of the flat surface may be based on a degree of the forwardly inclined angle of the one or more side portions.

The reflective sheet may comprise one or more reflective side portions extending from edges of a reflective central portion at a forwardly inclined angle, corresponding to the one or more side portions and the central portion of the support member; the reflective sheet includes a boundary line at which a first reflective side portion and an adjacent second reflective side portion meet each other; and the density of the plurality of scattering members disposed on the one or more side portions increases in a direction toward the boundary line.

The reflective sheet may comprise a plurality of openings corresponding to the plurality of lenses.

The plurality of scattering members may be disposed on the corner portions of the reflective sheet at a higher density than on a remaining portion of the reflective sheet.

The reflective sheet may comprise one or more reflective side portions extending from edges of a reflective central portion at a forwardly inclined angle, corresponding to the one or more side portions and the central portion of the support member.

A density of the plurality of scattering members may increase toward a boundary between two adjacent reflective side portions of the reflective sheet.

The density of the plurality of scattering members disposed on a first reflective side portion may increase in a second direction toward an adjacent second reflective side portion, and the density of the plurality of scattering members disposed on the adjacent second reflective side portion may increase in a first direction toward the first reflective side portion.

The plurality of scattering members may correspond to granularly shaped scattering members spaced apart and protruding from the reflective sheet.

The plurality of scattering members may correspond to linearly shaped scattering members spaced apart and protruding from the reflective sheet.

The reflective sheet may comprise one or more reflective side portions extending from edges of a reflective central portion at a forwardly inclined angle, corresponding to the one or more side portions and the central portion of the support member; and the plurality of scattering members disposed on a first reflective side portion are aligned in a second direction and the plurality of scattering members disposed on an adjacent second reflective side portion are aligned in a first direction.

The first direction and the second direction may be perpendicular.

Each of the plurality of lenses may include a top area, which is an outer surface area that is positioned rearward at a distance of 0.02 mm or less from a foremost point of an outer surface of the refractive lens, and a width of the top area is greater than a lateral distance from an edge of the lens to a point corresponding to an edge of the top area.

The width of the top area may be within the range of 4 mm and 30 mm.

The one or more side portions may comprise a first subset of side portions extending from first opposite edges of the central portion and a second subset of side portions extending from second opposite edges of the central portion; the first subset of side portions may be longer than the second subset of side portions; and the plurality of lenses may be configured such that a first width of each lens in a first direction corresponding to the first opposite edges of the central portion is greater than a second width of each lens in a second direction corresponding to the second opposite edges.

The plurality of lenses each may comprise a reflective lens having a reflective surface, wherein a horizontal distance between the corresponding light source and a peripheral edge of the reflective surface is greater than a vertical distance between the corresponding light source and a top of the reflective surface.

The horizontal distance may be at least 1.5 times greater than the vertical distance.

The horizontal distance may be within the range of 10 mm to 20 mm.

A width of a first side portion may be greater than a width of an adjacent second side portion.

The first side portion may be disposed at an edge in a first direction of the central portion and the second side portion may be disposed at an edge in a second direction perpendicular the first direction of the central portion.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a front view of a display apparatus according to an embodiment of the present invention;

FIG. 2 is an exploded perspective view of the display apparatus of FIG. 1, which schematically illustrates substantial parts thereof;

FIG. 3 is an elevation view showing the rear surface of a backlight unit of FIG. 2;

FIG. 4 is a cross-sectional view of the backlight unit of FIG. 3, which is taken along line S1-S1';

FIG. 5 is a cross-sectional view of the backlight unit of FIG. 3, which is taken along line S2-S2';

FIG. 6 shows elevation views Q and O illustrating lateral faces of two refractive lenses having different top area lengths Lt and Lt' according to an embodiment and illustrating images of light diffusion through the two refractive lenses when the refractive lenses are viewed from the front, in which an area having a relatively high light intensity is represented more brightly;

FIG. 7 is a graph showing light intensity f with a distance l from the central axis of the refractive lenses, in which both an experimental result using a refractive lens having a length of a top area of 4 mm or more and an experimental result using a refractive lens having a length of a top area less than 4 mm are represented;

FIG. 8 is an elevation view of the refractive lens of FIG. 6 when viewed from the front;

FIG. 9 is a cross-sectional view of the refractive lens of FIG. 8, which is taken along line S3-S3';

FIG. 10 shows elevation views Q and O illustrating lateral faces of reflective lenses having different horizontal projection lengths Lc and Lc' according to another embodiment;

FIGS. 11A and 11B are development views of a reflective sheet of FIGS. 4 and 5 to which a plurality of scattering members are coupled, in which FIG. 11A illustrates a plurality of scattering members according to an embodiment, and FIG. 11B illustrates a plurality of scattering members according to another embodiment; and FIGS. 12A to 12G are cross-sectional views of the scattering members of FIGS. 11A and 11B, in which FIG. 12A illustrates scattering members according to a first embodiment, 12B illustrates scattering members according to a second embodiment, 12C illustrates scattering members according to a third embodiment, 12D illustrates scattering members according to a fourth embodiment, 12E illustrates scattering members according to a fifth embodiment and 12F illustrates scattering members according to a sixth embodiment.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In the following description, the terms "forward," "rearward," "leftward," "rightward," "upward," and "downward," which indicate directions, are defined based on forward (F), rearward (R), leftward (Le), rightward (Ri), upward (U), and downward (D) directions as illustrated in the drawings. In this specification, the direction in which a display panel is positioned with respect to a backlight unit is defined as the forward direction, and the other directions are defined based on the forward direction. However, these definitions are given only for clear understanding of the present invention, and the directions may be defined differently depending on the circumstances.

In the following description, the terms "first," and "second" are used only to avoid confusion between designated components, and do not indicate the sequence or importance of the components or the relationships between the components. For example, a display apparatus may include only a second component, without a first component.

Referring to FIGS. 1 to 5, a display apparatus 1 according to an embodiment of the present invention includes a display panel 10 for displaying an image. The display panel 10 outputs images in the forward direction. For example, the display panel 10 may be a liquid crystal display (LCD) panel. The display panel 10 may be of a thin-film-transistor liquid-crystal-display type. The display panel 10 may be disposed in front of the backlight unit 30.

The display panel 10 may be configured to have a rectangular shape when viewed from the front. More specifically, the display panel 10 may be configured to have a rectangular shape having longer sides extending in a first direction and shorter sides extending in a second direction when viewed from the front. One of the vertical direction or the horizontal direction is the first direction, and the other is the second direction. In the embodiment, while the first direction is defined as the horizontal direction, there is no need for the invention to be restricted thereto.

The upper and lower ends of the display panel 10 may be configured to be parallel to each other. The left and right ends of the display panel 10 may also be configured to be parallel to each other. The upper end of the display panel 10 may be positioned so as to be perpendicular to the left and right ends of the display panel 10. The lower end of the display panel 10 may also be positioned so as to be perpendicular to the left and right ends of the display panel 10. In the embodiment, the upper and lower ends of the display panel 10 may constitute the longer sides, and the left and right ends of the display panel may constitute the shorter sides.

The display apparatus 1 includes the backlight unit 30, which is disposed behind the display panel 10. The backlight unit 30 radiates light to the display panel 10.

The display apparatus 1 may further include a frame (not shown) for supporting the backlight unit 30. The display apparatus 1 may include a support, which is in contact with an external wall body or an external ground so as to support the display apparatus 1. The support may be secured to the frame to support the frame. The backlight unit 30 may be secured to frame.

The display apparatus 1 includes a top cover 50 disposed along the peripheral edge of the display panel 10. The top cover 50 extends along one side edge of the display panel 10. The top cover 50 extends along at least one of the side edges (the upper end, the lower end, the right end and the left end) of the display panel 10. The top cover 50 may be fixedly coupled to the frame.

The top cover 50 may include a plurality of top covers 50. The top covers 50 may be disposed at the upper and lower sides and the left and right sides of the display panel 10. The top cover 50 includes a first top cover 50a that is disposed to extend along the lower end of the display panel 10. The top cover 50 includes a second top cover 50b that is disposed to extend along the upper end of the display panel 10. The top cover 50 includes a third top cover 50c that is disposed to extend along the left end of the display panel 10. The top cover 50 includes a fourth top cover 50d that is disposed to extend along the right end of the display panel 10. The first to fourth top covers 50a, 50b, 50c and 50d may be provided as separate components.

The display apparatus 1 may include an input unit (not shown) through which a user inputs commands to the display apparatus 1. The display apparatus 1 may include a sensing module (not shown) for receiving signals from an external remote controller.

The display apparatus 1 includes a controller (not shown) for the control of output of images. The display apparatus 1 may include a speaker (not shown), and the controller may control an acoustic signal. The controller may control the application of power to the display panel 10, the speaker and so on. The controller may include a circuit board (not shown) for implementation of the above-mentioned functions.

The display apparatus 1 may include a back cover 70 defining the back surface of the display apparatus 1. The back cover 70 may be secured to the frame. The back cover 70 may be disposed behind the backlight unit 30.

Hereinafter, the backlight unit 30 will be described in detail with reference to FIGS. 3 to 12f The backlight unit 30 defines an interior space for accommodating a plurality of light sources 35 and a plurality of lenses 33. The interior space 30s accommodates a reflective sheet 38. The interior space 30s accommodates a plurality of scattering members 39. A support member 34 defines the rear boundary of the interior space 30s. An optical sheet 31 or a diffusion sheet 32 defines the front boundary of the interior space 30s.

Referring to FIGS. 3 to 5, the backlight unit 30 may include the optical sheet 31. The optical sheet 31 may serve to minimize loss of light from the light sources 35 and to increase brightness. The optical sheet 31 is disposed in front of the backlight unit 30. The optical sheet 31 is disposed to be spaced forward from the plurality of lenses 33.

The backlight unit 30 may include the diffusion sheet 32. The diffusion sheet 32 may serve to disperse light over the entire surface thereof and to create a surface light source having a more uniform brightness. The diffusion sheet 32 is disposed in front of the backlight unit 30. The optical sheet 31 and the diffusion sheet 32 may be laminated to each other. The front surface of the diffusion sheet 32 may be attached to the rear surface of the optical sheet 31.

The backlight unit 30 includes the support member 34 for supporting the light sources 35 and the lenses 33. The support member 34 may support the optical sheet 31. The support member 34 may support the diffusion sheet 32. The support member 34 supports the reflective sheet 38.

The support member 34 is configured to have a rectangular shape overall when viewed from the rear. More specifically, the support member 34 is configured to have a rectangular shape having longer sides extending in a first direction and shorter sides extending in a second direction, when viewed from the rear. One of the vertical direction or the horizontal direction is the first direction, and the other is the second direction. In the embodiment, while the first direction is defined as the horizontal direction, there is no need for the invention to be restricted thereto.

The support member 34 is concave rearward so as to define the interior space 30s therein. The support member 34 includes a central portion 34c defining the central area of the rear surface of the interior space 30s. The support member 34 includes side portions 34a and 34b, which extend outward from the peripheral edge of the central portion 34c while being inclined forwards.

The side portions 34a and 34b support the optical sheet 31. The side portions 34a and 34b support the diffusion sheet 32. The rear surface of the diffusion sheet 32 may be coupled to the front ends of the side portions 34a and 34b. The side portions 34a and 34b are disposed at the peripheral region of the support member 34. The side portions 34a and 34b may be respectively disposed at the side edges (the upper side edge, the lower side edge, the left side edge and the right side edge) of the backlight unit 30. The opposite ends of each of the side portions 34a and 34b may be connected to the adjacent side portions 34a and 34b. Each of the side portions 34a and 34b may be configured to have a plate shape.

The side portions 34a and 34b are connected to the peripheral edge of the central portion 34c. The side portions extend along the peripheral edge of the central portion 34c. The side portions 34a and 34b may be respectively disposed at the side edges (the upper side edge, the lower side edge, the left side edge and the right side edge) of the central portion 34c.

The side portion 34b that is disposed at the upper side of the central portion 34c extends upward while being inclined forward. The side portion 34b that is disposed at the lower side of the central portion 34c extends downward while being inclined forward. The side portion 34a that is disposed at the left side of the central portion 34c extends leftward while being inclined forward. The side portion 34b that is disposed at the right side of the central portion 34c extends rightward while being inclined forward.

The side portions 34a and 34b include first side portions 34a, which are disposed in the first direction of the central portion 34c. The first side portions 34a are inclined in the first direction. The first side portions 34a extend in the second direction. The pair of first side portions 34a are disposed at opposite sides of the central portion 34c in the first direction. In the embodiment, the first side portions 34a are disposed in the left and right directions of the central portion 34c, and are inclined in the left and right directions.

The length that the first side portion 34a extends in the inclined direction may be defined as a first inclined direction length Da.

The side portions 34a and 34b include second side portions 34b, which are disposed in the second direction of the central portion 34c. The second side portions 34b are inclined in the second direction. The second side portions 34b extend in the first direction. The pair of second side portions 34b are disposed at the opposite sides of the central portion 34c in the second direction. In the embodiment, the second side portions 34b are disposed in the upward and downward directions of the central portion 34c, and are inclined in the upward and downward directions.

The length that the second side portion 34b extends in the inclined direction may be defined as a second inclined direction length Db.

The length of the backlight unit 30 in the first direction and the length of the backlight unit 30 in the second direction may be different from each other. The first inclined direction length Da and the second inclined direction length Db may be different from each other.

For example, the length of the backlight unit 30 in the first direction may be longer than the length of the backlight unit 30 in the second direction. For example, the first inclined direction length Da may be longer than the second inclined direction length Db.

The first side portions 34a and the second side portions 34b are connected to each other at the corner portions of the support member 34. The boundary lines between the first side portions 34a and the second side portions 34b are inclined.

The central portion 34c is configured to have a rectangular shape when viewed from the front. The central portion 34c may be configured to have a rectangular shape having longer sides extending in the first direction and shorter sides extending in the second direction.

The central portion 34c is disposed at a position that is spaced apart rearward from the diffusion sheet 32. The central portion 34c supports the plurality of light sources 35. The central portion 34c supports the plurality of lenses 33. The plurality of light sources 35 are disposed on the front surface of the central portion 34c. The reflective sheet 38 is disposed on the front surface of the central portion 34c. The lenses 33 are disposed on the front surface of the central portion 34c.

The central portion 34c may be configured to have a plate shape defining a thickness in the anteroposterior direction. The side edges of the central portion 34c are connected to the rear ends of the side portions 34a and 34b. More specifically, the upper side edge, the lower side edge, the left side edge and the right side edge of the central portion 34c may be respectively connected to the rear ends of the side portions 34a and 34b, which are disposed at the respective side edges of the central portion 34c.

The backlight unit 30 includes the plurality of light sources 35, which are disposed on the central portion 34c to radiate light. For example, each of the light sources 35 may be a cold cathode fluorescent lamp (CCFL) or a light-emitting diode (LED).

Referring to FIGS. 11A and 11B, which show development views of the reflective sheet 38 and which illustrate a plurality of openings 38g at which the plurality of lenses 33 are positioned, the plurality of light sources 35 may be arranged to be spaced apart from each other in the first direction. The plurality of light sources 35 may be arranged to be spaced apart from each other in the second direction. The plurality of light sources 35 may be arranged in rows in the first and second directions. The distance between two adjacent light sources 35, which are spaced apart from each other in the first direction, may be greater than the distance between two adjacent light sources 35, which are spaced apart from each other in the second direction.

Referring to FIGS. 4 to 10, the backlight unit 30 includes the plurality of lenses 33, which are respectively disposed at the plurality of light sources 35. The lenses 33 serve to disperse light from the light sources 35. The lenses 33 may perform refraction and/or reflection of light radiated from the light sources 35. FIGS. 6 and 10 schematically illustrate light traveling paths G, G1 and G2.

The lenses 33 are disposed so as to cover the light sources 35. The plurality of lenses 33 are secured to the central portion 34c. The plurality of lenses 33 are disposed on the front surface of the central portion 34c.

The length of the lens 33 that is measured in the first direction may be defined as a first width La, and the length of the lens 33 that is measured in the second direction may be defined as a second width Lb. The lens 33 may be configured to have an elliptical shape when viewed from the front. The length of the long axis of the elliptical shape may be a first width La, and the length of the short axis of the elliptical shape may be a second width Lb.

Referring to FIGS. 6 to 9, the plurality of lenses 33 may include refractive lenses 133 according to an embodiment. Each of the refractive lenses 133 is constructed such that the center region of the outer surface thereof projects further forward than the peripheral region thereof. Light radiated from the light sources 35 may be refracted at the outer surface of the refractive lenses 133 (see arrow G). The refractive lenses 133 may be positioned adjacent to the side portions 34a and 34b. Among the plurality of lenses 33, the lenses 33 that are positioned adjacent to the side portions 34a and 34b may be the refractive lenses 133.

The peripheral region of the outer surface of the refractive lens 133 is configured to have a predetermined curvature. The center region of the outer surface of the refractive lens 133 is configured to be flat. The center region of the outer surface of the refractive lens 133 is disposed to be perpendicular to the central axis Od of the refractive lens 133. The central axis Od means an imaginary axis that passes through the center of the refractive lens 133 in the anteroposterior direction.

The refractive lens 133 includes a top area At, which is an outer surface area that is positioned rearward at a distance of 0.02 mm or less from the foremost point of the outer surface. The foremost point of the refractive lens 133 is located at the center of the outer surface thereof.

The length Lt of the top area At that is measured in a direction perpendicular to the anteroposterior direction may be defined. The length Lt of the top area At may be measured in a direction in which side portions having a longer length in the inclined direction among the first side portions 34a and the second side portions 34b are arranged. In the embodiment, the first inclined direction length Da of each of the first side portions 34a is greater than the second inclined direction length Db. In the embodiment, the length Lt of the top region At is measured in the first direction, in which the first side portions 34a are arranged.

Referring to FIG. 6, a distance Lh between the foremost point of the refractive lens 133 and an outer surface which is positioned rearward from the foremost point increases moving toward the peripheral edge of the refractive lens 133. The top area At defines an outer surface that is contained within a boundary defined by the distance Lh of 0.2 mm.

Referring to FIG. 9, the horizontal length Lt of the top area At of the refractive lens 133 in a vertical section thereof is greater than a horizontal length Lp of one of both side peripheral areas 133b, which are positioned at both sides of the top area At, and is also greater than a horizontal length Lp of the other one thereof. In a section which is obtained by cutting the refractive lens 133 in the first direction, the length Lt, in the first direction, of the top area At of the refractive lens 133 is greater than a length, in the first direction, of one of both side peripheral areas 133b, which are positioned at both sides of the top area At, and is also greater than a length, in the first direction, of the other one thereof.

Preferably, the length Lt of the top area At is 4 mm or more. Referring to the light traveling path G shown in FIG. 6, it is ascertained that a range that the light, which is radiated from the light source 35 and is then refracted while passing through the top area At, reaches in the direction of the length Lt is greater in a case Q having a longer length Lt than in a case O having a shorter length Lt'.

The dotted-line graph of FIG. 7 shows an experimental result using a refractive lens 133 of FIG. 6, and the solid-line graph of FIG. 7 shows an experimental result using a refractive lens 133' of FIG. 6. Referring to FIG. 7, it is ascertained that light is more uniformly dispersed to a greater distance l from the central axis Od of the refractive lens 133 in the case where the length Lt of the top area At is 4 mm or more than in the case where the length Lt is less than 4 mm. Furthermore, it is ascertained that light is significantly uniformly dispersed in an area in which the distance l ranges from 0 to 100 mm in the case where the length Lt of the top area At is 4 mm or more. In addition, it is ascertained that the light intensity fin an area in which the distance l ranges from 50 to 200 mm is greater in the case where the length Lt of the top area At is 4 mm or more than in the case where the length Lt of the top area At is less than 4 mm.

More preferably, the length Lt of the top area At is 4 mm or more but 30 mm or less. If the length Lt excessively increases, an area of the top area At at which the light from the light source 35 is totally reflected excessively increases, thereby making efficient dispersion of light difficult.

More preferably, the length Lt is 9 mm or more. More preferably, the length Lt is 9 mm or more but 10 mm or less.

The length of the refractive lens 133, which is measured in a direction in which side portions having a longer inclined direction length Da, among the first side portions 34a and the second side portions 34b, are arranged, is defined as the first width La. In addition, the length of the refractive lens 133, which is measured in the direction in which side portions having a shorter inclined direction length Db, among the first side portions 34a and the second side portions 34b, are arranged, is defined as the second width Lb. The first width La is set to be greater than the second width Lb. Accordingly, light can be dispersed to a greater distance in the direction in which the side portions having a longer length in the inclined direction are arranged.

Referring to FIGS. 8 and 9, the refractive lens 133 may be configured to have an elliptical shape when viewed from the front. The width of the elliptical refractive lens 133 in the direction of the long axis is defined as the first width La, and the width of the elliptical refractive lens 133 in the direction of the short axis is defined as the second width Lb.

The refractive lens 133 includes a top portion 133 defining the top area At. The top portion 133a is positioned at the center of the refractive lens 133. The top portion 133a may be configured so as to have an elliptical shape when viewed from the front. The direction of the long axis of the elliptical top portion 133a may be the first direction, and the direction of the short axis of the elliptical top portion 133b may be the second direction.

The refractive lens 133 includes a peripheral portion 133b extending along the periphery of the top portion 133a. The peripheral portion 133b has an outer surface which is positioned rearward moving toward the peripheral edge. The outer surface of the peripheral portion 133b may be rounded.

The refractive lens 133 includes a light source receptor 133s at which the rear surface of the refractive lens 133 is partially recessed forward. The light source receptor 133s may define a space therein, and the light source 35 may be accommodated in the space. The light source receptor 133s is located at the center of the rear portion of the refractive lens 133. The light source receptor 133s is positioned behind the top area At.

Referring to FIG. 10, the plurality of lenses 33 may include a reflective lens 233 according to an embodiment. The reflective lens 233 has a reflective surface 233a, which is positioned further forward moving toward the periphery from the center. The reflective surface 233a is able to totally reflect light from the light source 35. Light radiated from the light source 35 can be totally reflected at the reflective surface 233a of the reflective lens 233 (see arrow G1). Among the total light radiated from the light source 35, light, which is incident at a smaller angle with respect to the central axis Or, may pass through the reflective surface 233a and may be refracted while passing through the reflective surface 233a (see arrow G2). The reflective lens 233 may be positioned adjacent to the side portions 34a and 34b. Among the plurality of lenses 33, a plurality of lenses 33, which are arranged adjacent to the side portions 34a and 34b, may be the reflective lenses 233.

The reflective surface 233a may be formed at the boundary between media such as glass and air, and may be formed at the boundary between two different transparent materials.

The reflective surface 233a is inclined rearward moving toward the center. The reflective surface 233a is positioned forward with increasing distance from the central axis Or of the reflective lens 233. The inclination of the reflective surface 233a may be increased moving toward the central axis Or. In this regard, the central axis Or means an imaginary axis that passes through the center of the reflective lens 233 in the anteroposterior direction.

The distance from the central axis Or to the peripheral edge of the reflective lens 233 may be defined as a horizontal projection length Lc. The horizontal projection length Lc is measured in a direction perpendicular to the anteroposterior direction. The horizontal projection length Lc may be measured in a direction in which side portions having a greater length in the inclined direction among the first side portions 34a and the second side portions 34b are arranged. In the embodiment, the first inclined direction length Da of each of the first side portions 34a is greater than the second inclined direction length Db of each of the second side portions 34b. In the embodiment, the horizontal projection length Lc is measured in the first direction, in which the first side portions 34a are arranged.

The horizontal projection length Lc, which is a horizontal distance between the light source 35 and the peripheral edge of the reflective surface 233a, may be greater than a vertical lengh Lv between the light source 35 of the peripheral edge of the reflective surface 233a. Preferably, the horizontal projection length Lc is 1.5 times the vertical lengh Lv. More preferably, the projection length LC ranges from 1.5 times to 3 times the vertical lengh Lv.

Preferably, the horizontal projection length Lc is 10 mm or more. Referring to the light traveling path G1 of FIG. 10, it is ascertained that the range that the light, which is radiated from the light source 35 and is then totally reflected at the reflective surface 233a, reaches is larger in a case Q having a greater horizontal projection length Lc than in a case O having a smaller horizontal projection length Lc'.

More preferably, the horizontal projection length Lc is 10 mm or more but 20 mm or less. If the horizontal projection length Lc excessively increases, the area of the reflective surface 233a, at which the light from the light source 35 is totally reflected, excessively increases, thereby making efficient dispersion of light difficult.

The reflective lens 233 may be configured to have an elliptical shape when viewed from the front. The direction of the long axis of the elliptical reflective lens 233 may be the first direction, and the direction of the short axis of the elliptical reflective lens 233 may be the second direction.

The reflective lens 233 includes a light passage portion 233b through which light is incident to the reflective surface 233a and through which light reflected at the reflective surface 233a passes. The light passage portion 233b may be a portion defining a space. The light passage portion 233b is positioned behind the reflective surface 233a.

The reflective lens 233 includes a light source receptor 233s at which the rear surface of the reflective lens 233 is partially recessed forward. The light source receptor 233s may define a space, and the light source 35 is accommodated in the space. The light source receptor 233s is located at the center of the rear portion of the reflective lens 233. The light source receptor 233s is positioned behind the reflective surface 233a.

Referring to FIGS. 4, 5, 11A and 11B, the backlight unit 30 includes the reflective sheet 38 covering the front surface of the support member 34. The reflective sheet 38 covers the front surface of the central portion 34c. The reflective sheet 38 covers the front surfaces of the side portions 34a and 34b. FIGS. 11A and 11B show development views of the reflective sheet 38, which is adapted to cover the front surface of the central portion 34c perpendicular to the anteroposterior direction and to cover the inclined front surfaces of the side portions 34a and 34b.

The reflective sheet 38 reflects light that is incident on the reflective sheet 38. The reflective sheet 38 may reflect light, which is radiated in the upward, downward, leftward and rightward direction or in the rearward direction, in the forward direction (see arrows Gr of FIGS. 4 and 5, which are light traveling paths). In FIGS. 4 and 5, the arrow G indicates a light traveling path in which light from the light source 35 is directly radiated forward through the lens 33, and the arrow Gr indicates a light traveling path in which light from the light source 35 is radiated through the lens 33 and is then reflected forward at the reflective sheet 38.

The reflective sheet 38 includes a reflective central portion 38c covering the front surface of the central portion 34c. The reflective central portion 38c is configured to have a shape corresponding to the central portion 34c. The reflective central portion 38c is configured to have a rectangular shape when viewed from the front. The reflective central portion 38c may be configured to have a rectangular shape having longer sides extending in the first direction and shorter sides extending in the second direction.

The reflective sheet 38 includes reflective side portions 38a and 38b covering the side portions 34a and 34b. The reflective side portions 38a and 38b are configured to have shapes corresponding to the side portions 34a and 34b. Although the reflective side portions 38a and 38b are illustrated as being constructed such that a clearance is provided at the boundary line Bo of a corner portion 38t thereof in the development views of FIGS. 11A and 11B, the clearance is eliminated after the reflective side portions 38a and 38b are attached to the front surfaces of the side portions 34a and 34b.

The reflective sheet 38 includes first reflective side portions 38a covering the front surfaces of the first side portions 34a. The reflective sheet 38 includes second reflective side portions 38b covering the front surfaces of the second side portions 34b.

The backlight unit 30 includes the plurality of scattering members 39 disposed on the corner portions 38t defined by the side portions 34a and 34b. The plurality of scattering members 39 are disposed on the four corner portions 38t defined by the side portions 34a and 34b. The plurality of scattering members 39 serve to assist in forwardly reflecting light incident on the reflective sheet 38. Although a relatively small amount of forward light may be generated from the corner portion 38t, which is located at a relatively long distance from the light source 35 and the lens 33, the disposition of the plurality of scattering members 39 on the corner portion 38t enables the amount of forward light from the corner portion 38t to be increased.

The plurality of scattering members 39 protrude from the reflective sheet 38. Specifically, the plurality of scattering members 39 may protrude forward from the reflective sheet 38.

The plurality of scattering members 39 are disposed on the reflective sheet 38. The plurality of scattering members 39 are disposed on the reflective side portions 38a and 38b of the reflective sheet 38. The plurality of scattering members 39 are disposed on the corner portions 38t of the reflective sheet 38. The plurality of scattering members 39 may be disposed at a higher density on the corner portions 38t of the reflective sheet 38 than on other portions of the reflective sheet 38. The plurality of scattering members 39 may be disposed at a higher density on the corner portions 38t than on other portions of the reflective side portions 38a and 38b.

The plurality of scattering members 39 may be disposed only on the corner portions 38t. As a result, it is possible to realize more uniform light radiation over the entire front surface of the backlight unit 30.

Each of the corner portions 38t includes the boundary line Bo at which the first reflective side portion 38a and the second reflective side portion 38b of the reflective sheet 38 meet each other. The corner portion 38t includes a neighboring area adjacent to the boundary line Bo. The plurality of corner portions 38t are respectively disposed on a left and upper portion, a right and upper portion, a left and lower portion and a right and lower portion of the reflective sheet 38 when viewed from the front.

Referring to FIG. 11A, the plurality of scattering members 39 may be arranged such that the density of the scattering members 39 increases moving toward the boundary line Bo. Accordingly, since the plurality of scattering members 39 assist in the relatively active forward reflection of light at the neighboring area of the boundary line Bo, which is a cleavage between the adjacent reflective side portions and which thus makes forward reflection of light difficult, it is possible to realize uniform light radiation over the entire front surface of the backlight unit 30.

Referring to FIG. 11B, the plurality of scattering members 39 may be arranged such that the density of the scattering members 39 increases moving toward the corner point Pc that is located at the outermost point of the boundary line Bo. In this way, since the plurality of scattering members 39 assist in the relatively active forward reflection of light in the area that is far away from the light source 35 and thus which makes forward reflection of light difficult, it is possible to realize more uniform light radiation over the entire front surface of the backlight unit 30.

The first reflective side portions 38a are positioned at both sides of the reflective central portion 38c in the first direction, and extend in the second direction. The second reflective side portions 38b are positioned at both sides of the reflective central portion 38c in the second direction, and extend in the first direction.

The first reflective side portions 38a are positioned at left and right sides of the reflective central portion 38c and extend vertically. The second reflective side portions 38b are positioned at upper and lower sides of the reflective central portion 38c and extend horizontally. Referring to FIG. 11B, the plurality of scattering members 39 may be arranged such that the density of the scattering members 39 on the first reflective side portions 38a increases moving toward the boundary line Bo in the second direction. Also, the plurality of scattering members 39 may be arranged such that the density of the scattering members 39 on the first reflective side portions 38a increases moving toward the boundary line Bo in the vertical direction. Referring again to FIG. 11B, the plurality of scattering members 39 may be arranged such that the density of the scattering members 39 on the second reflective side portions 38b increases moving toward the boundary line Bo in the first direction. The plurality of scattering members 39 may be arranged such that the density of the scattering members 39 on the second reflective side portions 38b increases moving toward the boundary line Bo in the horizontal direction. Accordingly, since the plurality of scattering members 39 assist in the relatively active forward reflection of light at the boundary line Bo having a cleavage shape and at the area far away from the light source 35, at which the forward reflection of light is difficult, it is possible to realize more uniform light radiation over the entire front surface of the backlight unit 30.

Referring to FIG. 11A, the plurality of scattering members 39 may include a plurality of granularly shaped scattering members 139, which are arranged to be spaced apart from each other in both the vertical and horizontal directions. The granularly shaped scattering members 139 protrude from the reflective sheet 38 so as to form protrusions.

Referring to FIG. 11B, the plurality of scattering members 39 may include a plurality of linearly shaped scattering members 239, which extend in one direction selected from among the vertical and horizontal directions and are spaced apart from each other in the other direction thereof.

The plurality of linearly shaped scattering members 239 may be arranged such that the linearly shaped scattering members 239 on the first reflective side portion 38a extend in the first direction, whereas the linearly shaped scattering members 239 on the second reflective side portion 38b extend in the second direction. The plurality of linearly shaped scattering members 239 may be arranged such that the linearly shaped scattering members 239 on the first reflective side portion 38a extend in the horizontal direction, whereas the linearly shaped scattering members 239 on the second reflective side portion 38b extend in the vertical direction. Accordingly, the linearly shaped scattering members 239 disposed on the first reflective side portion 38a are advantageous in scattering incident light from the plurality of lenses 33, which are vertically arranged adjacent to the first reflective side portion 38a, in the forward direction, whereas the linearly shaped scattering members 239 disposed on the second reflective side portion 38b are advantageous in scattering incident light from the plurality of lenses 33, which are horizontally arranged adjacent to the second reflective side portion 38b, in the forward direction.

In the first reflective side portion 38a, the plurality of linearly shaped scattering members 239 are arranged to be spaced apart from each other in the second direction. In the second reflective side portion 38b, the plurality of linearly shaped scattering members 239 are arranged to be spaced apart from each other in first direction. In the embodiment, in the first reflective side portion 38a, the plurality of linearly shaped scattering members 239 are arranged to be spaced apart from each other in the vertical direction. In the second reflective side portion 38b, the plurality of linearly shaped scattering members 239 are arranged to be spaced apart from each other in the horizontal direction.

Sections 39a, 39b, 39c, 39d, 39e, 39f and 39g shown in FIGS. 12A to 12G may be sections of the granularly shaped scattering member 139 shown in FIG. 11A or transverse sections of the linearly shaped scattering member 239 shown in FIG. 11B.

Referring to FIG. 12A, the granularly shaped scattering member 39a may be configured to have a hemispherical shape. Meanwhile, the linearly shaped scattering member 39a may have a semicircular section.

Referring to FIG. 12B, the granularly shaped scattering member 39b may be configured as a square column, a circular column or the like. Meanwhile, the linearly shaped scattering member 39b may have a trapezoidal section.

Referring to FIG. 12C, the granularly shaped scattering member 39c may be configured to have a conical or pyramid shape. For example, the granularly shaped scattering member 39c may be configured to have a conical shape, a triangular pyramid shape, a square pyramid shape or so on. Meanwhile, the linearly shaped scattering member 39c may have a triangular section. For example, the linearly shaped scattering member 39c may have an isosceles triangular shape, an equilateral triangular shape or the like.

Referring to FIG. 12D, the granularly shaped scattering member 39d may be configured to have a composite shape of a square pyramid shape joined to the upper surface of a rectangular column shape (wherein the lower surface of the square pyramid shape overlaps the upper surface of the square pyramid shape). Alternatively, the granularly shaped scattering member 39d may be configured to have a composite shape of a conical shape joined to the upper surface of a circular column shape (wherein the lower surface of the conical shape overlaps the upper surface of the circular column). Meanwhile, the linearly shaped scattering member 39d may have a pentagonal section. The linearly shaped scattering member 39d may have a composite section of an isosceles triangular section joined to the upper side of a rectangular section (wherein the length of the upper side of the rectangular section equals the length of the lower side of the isosceles triangular section).

Referring to FIG. 12E, the granularly shaped scattering member 39e may be configured to have a hemispherical shape having a semi-elliptical section. Meanwhile, the linearly shaped scattering member 39e may have a semi-elliptical section.

Referring to FIG. 12F, the granularly shaped scattering member 39f may be configured to have a composite shape of a truncated square pyramid shape joined to the upper surface of a square column shape (wherein the lower surface of the truncated square pyramid shape overlaps the upper surface of the square column shape). Alternatively, the granularly shaped scattering member 39d may be configured to have a composite shape of a truncated conical shape joined to the upper surface of a circular column shape (wherein the lower surface of the truncated conical shape overlaps the upper surface of the circular column shape). Meanwhile, the linearly shaped scattering member 39f may have a hexagonal section. The linearly shaped scattering member 39f may have a composite section of a trapezoidal section joined to the upper side of a rectangular section (wherein the length of the lower side of the trapezoidal section equals the length of the upper side of the rectangular section).

Referring to FIG. 12G, the granularly shaped scattering member 39g may be configured to have a triangular pyramid shape having a right triangular section. Meanwhile, the linearly shaped scattering member 39g may have a right triangular section.

As is apparent from the above description, since the plurality of scattering members are disposed on the corner portions, which are located at relatively long distances from the light sources and the lenses, there is an effect of increasing the amount of forward light from the corner portions, which would otherwise generate a relatively small amount of forward light.

Furthermore, since the plurality of scattering members are disposed only on the corner portions, there is an effect of uniformly radiating light over the entire front surface of the backlight unit.

In addition, since the plurality of scattering members are arranged such that the density of the scattering members increases moving toward the boundary line, there is an effect of more uniformly radiating light over the entire front surface of the backlight unit.

Furthermore, since the plurality of scattering members are arranged in such a manner that the density of the scattering members disposed on the first reflective side portion increases moving toward the boundary line in the vertical direction whereas the density of the scattering members disposed on the second reflective side portion increases moving toward the boundary line in the horizontal direction, there is an effect of more uniformly radiating light over the entire front surface of the backlight unit.

In addition, since the plurality of scattering members are arranged such that the density of the scattering members increases moving toward the corner points, there is an effect of more uniformly radiating light over the entire front surface of the backlight unit.

Furthermore, since the plurality of linearly shaped scattering members disposed on the first reflective side portion extend in the horizontal direction, whereas the plurality of linearly shaped scattering members disposed on the second reflective side portion extends in the vertical direction, it is advantageous for the plurality of linearly shaped scattering members to scatter incident light from the plurality of lenses in the forward direction.

In a vertical section of the refractive lens, the horizontal length Lt of the top area is longer than a horizontal length Lp of each of both side peripheral areas. Accordingly, the range that the light, which is radiated from the light sources and is refracted while passing through the top area, reaches is increased in the direction of the horizontal length Lt.

In this regard, by setting the horizontal length Lt of the top area of the refractive lens to be 4 mm or more, the range that the light, which is radiated from the light source and is refracted while passing through the top area, reaches is increased in the direction of the horizontal length Lt (see FIG. 7).

Setting the horizontal length Lt of the top area to be 4 mm or more enables the efficient dispersion of light.

Since the refractive lens is configured such that the first width La thereof is longer than the second width Lb thereof, it is possible to disperse light farther in the direction in which the side portions having a longer length in the inclined direction are arranged.

Since the horizontal projection length Lc between the peripheral edge of the reflective surface and the light source is longer than the vertical lengh Lv between the peripheral edge of the reflective surface and the light source, it is possible to increase the range that the light, which is radiated from the light source and is totally reflected at the reflective surface, reaches.

By setting the horizontal projection length Lc to be at least 1.5 times the vertical length Lv, it is possible to further increase the range that the light, which is radiated from the light source and is totally reflected at the reflective surface, reaches.

By setting the horizontal projection length Lc to be 10 mm or more, it is possible to increase the range that light, which is radiated from the light source and is totally reflected at the reflective surface, reaches.

By setting the horizontal projection length Lc to be 10 mm or more but 20 mm or less, it is possible to realize efficient dispersion of light.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
a display panel; and
a backlight unit positioned at a rear side of the display panel, wherein the backlight unit comprises:
a support member comprising a central portion and one or more side portions extending from edges of the central portion at a forwardly inclined angle;
a plurality of light sources disposed at the central portion and configured to emit light;
a plurality of lenses correspondingly disposed on the plurality of light sources and configured to disperse the light emitted from the plurality of light sources; and
a reflective sheet positioned at a front side of the support member, the reflective sheet comprising a plurality of scattering members protruding from the reflective sheet and configured to scatter the light dispersed by the plurality of lenses, wherein:
the reflective sheet comprises one or more reflective side portions extending from edges of a reflective central portion at a forwardly inclined angle such that boundaries are defined between ends of each of the one or more reflective side portions and ends of corresponding adjacent reflective side portions;

the one or more reflective side portions correspond to the one or more side portions of the support member and the reflective central portion corresponds to the central portion of the support member; and a density of the plurality of scattering members disposed on each of the one or more reflective side portions increases toward the boundaries defined between ends of the reflective side portion and ends of corresponding adjacent reflective side portions;

the one or more side portions comprises a first subset of side portions extending from first opposite edges of the central portion and a second subset of side portions extending from second opposite edges of the central portion;

the first subset of side portions are longer than the second subset of side portions;

the plurality of lenses are configured such that a first width of each lens in a first direction corresponding to the first opposite edges of the central portion is greater than a second width of each lens in a second direction corresponding to the second opposite edges;

each of the plurality of lenses comprises a refractive lens formed such that a center region of an outer surface thereof projects further forward than a peripheral region thereof;

the refractive lens comprises a top area, which is an outer surface area that is positioned rearward at a distance of 0.02 mm or less from a foremost point of an outer surface of the refractive lens; and a length of the top area in the first direction is greater than a lateral distance from an edge of the lens to a point corresponding to an edge of the top area.

2. The display apparatus of claim 1, wherein a top of each of the plurality of lenses comprises a flat surface, and a width of the flat surface is based on a degree of the forwardly inclined angle of the one or more side portions.

3. The display apparatus of claim 1, wherein the reflective sheet comprises a plurality of openings corresponding to the plurality of lenses.

4. The display apparatus of claim 1, wherein the plurality of scattering members are disposed on corner portions of the reflective sheet at a higher density than on a remaining portion of the reflective sheet.

5. The display apparatus of claim 1, wherein the density of the plurality of scattering members disposed on a first reflective side portion increases in a second direction toward an adjacent second reflective side portion, and the density of the plurality of scattering members disposed on the adjacent second reflective side portion increases in a first direction toward the first reflective side portion.

6. The display apparatus of claim 1, wherein the plurality of scattering members correspond to granularly shaped scattering members spaced apart and protruding from the reflective sheet.

7. The display apparatus of claim 1, wherein the plurality of scattering members correspond to linearly shaped scattering members spaced apart and protruding from the reflective sheet.

8. The display apparatus of claim 7, wherein:

the plurality of scattering members disposed on a first reflective side portion are laterally aligned to be parallel with each other in a second direction and the plurality of scattering members disposed on an adjacent second reflective side portion are laterally aligned to be parallel with each other in a first direction.

9. The display apparatus of claim 8, wherein the first direction and the second direction are perpendicular.

10. The display apparatus of claim 1, wherein the width of the top area is within the range of 4 mm and 30 mm.

11. The display apparatus of claim 1, wherein a width of a first side portion is greater than a width of an adjacent second side portion.

12. The display apparatus of claim 11, wherein the first side portion is disposed at an edge in a first direction of the central portion and the second side portion is disposed at an edge in a second direction perpendicular the first direction of the central portion.

* * * * *